United States Patent Office 2,908,607
Patented Oct. 13, 1959

2,908,607

AQUEOUS COMPOSITION CONSISTING OF AMMONIA AND A HEAVY METAL SALT OF MIXED POLYCHLOROPHENOLS

Bror Olof Hager, Stockholm, Sweden

No Drawing. Application May 1, 1957
Serial No. 656,226

4 Claims. (Cl. 167—38.7)

This invention relates to the preservation of wood, textiles, cordage, leather and other fibrous materials of an organic nature, and is concerned with the provision of a preservative composition containing polychlorophenols and an amine-forming metal radical, e.g., copper.

The search for compositions having a preservative action toward wood has been a continuing matter. More recently, chlorinated products have become of interest, because many of them have proved to possess a high protective effect and a good resistance to evaporation and leaching, and, consequently, have satisfied certain fundamental conditions which are necessary for imparting a lasting protection to wood. Naturally, also the low price of the chlorine has been a contributive factor. Among the chlorinated substances, the chlorophenols have shown favorable properties and attained considerable importance.

It had long been known that phenol is a substance having protective effect. If a chlorine atom is introduced into the molecule, monochlorophenol is formed, which latter has a many times higher protective effect. If a second chlorine atom is introduced, dichlorophenol is obtained, the effect of which is still many times higher. If a third chlorine atom is introduced, trichlorophenol is formed, the effect of which is several times higher than that of the dichlorophenol. Certain tests indicate that trichlorophenol has an effect which is about 100 times as high as that of phenol per se. If a fourth and fifth atom are introduced, tetra- and penta-chlorophenol are obtained. But, if the chlorine content is still more increased, the effect seems to be reduced a little in relation to that of trichlorophenol. Thus, the latter seems to have the highest effect, then comes tetrachlorophenol, and finally pentachlorophenol, said three polychlorophenols being, as mentioned above, very superior to the lower chlorinated phenols. It might thus seem natural to use trichlorophenol and not to introduce so much chlorine that tetra- and penta-chlorophenol are formed. However, there is also another determining factor, viz., that the polychlorophenols become more and more difficult to volatilize and to dissolve the higher is the chlorine content. Ordinary phenol is, thus, too volatile and too easily soluble to make it useful as a preserving agent for wood. Mono-, and di-, and to a certain extent, also tri-chlorophenol are not sufficiently difficult to volatilize and to dissolve. Tetrachlorophenol is a stable product; it is difficult to volatilize and difficult to dissolve in various respects, and it is rather easy to produce. Pentachlorophenol is still more stable than tetrachlorophenol, and for this reason one has tried to produce the same even if the production has met with difficulties.

After the introduction of the pentachlorophenol on the market 20 years ago, the same has become very extensively used as a wood preserving agent. For impregnation, it has been used in oil solution. In order to avoid the use of the expensive oil, it has been attempted to use water as a solvent; however, it has practically not been possible to overcome the difficulties to obtain a rational dissolving in water and, after impregnation has been effected, to cause the pentachlorophenol to precipitate in the wood. In this connection, it has also been proposed to combine the pentachlorophenol with copper to form copper pentachlorophenolate and to carry out the impregnation with a solution thereof. The copper pentachlorophenolate has proved to have even better protective properties than pentachlorophenol itself, and it is also a very stable compound. It has been attempted to dissolve this compound in an aqueous solution of ammonia. However, this has met with great difficulties and has only succeeded by using relatively large quantities of water-soluble organic solvents, with the result that the process is so expensive that it is not feasible for practical use.

According to the present invention the problem has been solved on other lines. As mentioned above, only the higher chlorinated phenols—tri-, tetra- and penta-chlorophenols—should be used for the protection of wood to get an efficient result, mono- and di-chlorophenol having a low effect and being too volatile and too easily dissolvable; also, trichlorophenol—alone—is too volatile and too easily dissolvable. The present invention, however, is based on my discovery that these more highly chlorinated phenols have a surprising "mutual-dissolving" effect on each other, so that in admixture with each other they have a sufficient solubility to make it possible to produce therefrom water solutions of desired preservative effect.

On the other hand, when it is a question of the copper salts of the chlorophenols—which are preferred as protective agents on account of their enhanced effect—it must be remembered that the phenolates (salts) have quite another resistance to evaporation and leaching than the phenols. The tri- and tetra-salts with copper have properties which, in this respect, are similar to the penta-salt. Thus, copper salts of the three highest chlorophenols may be used—not merely the copper pentachlorophenolate.

Dissolution in ammonia has met with difficulties, and there are several reasons why it has not been possible heretofore to manage this problem. On the one hand, investigators have obviously concerned themselves with the pentaphenolate; on the other hand, the available technical preparations have had a very varying composition and they have contained insoluble compounds of unknown composition. It has been difficult to make tests, and the results obtained have not been uniform.

From such tests, however, the following facts have become clear. Chemically pure pentachlorophenol is very difficult to dissolve in copper amine solutions. Technical pentachlorophenol, which has been purified in a special manner, can be dissolved in low concentration. Also chemically pure tetrachlorophenol is difficult to dissolve, whereas the techincal product can, after certain purification, be dissolved up to about 2 percent. Furthermore, it has been possible to dissolve various mixtures of chemically pure pentachlorophenol and purified technical tetrachlorophenol. As will be seen below, they have no doubt also contained lower chlorinated substances. In a similar manner, mixtures of trichlorophenols can be dissolved up to 1.5 to 2.0 percent, and also mixtures thereof with tetra- and penta-chlorophenol. The individual trichlorophenols can be dissolved only to about 0.5 percent. The cited values must only be looked upon by way of guidance because the exact composition of the prior art preparations has not been completely known.

It has now been found, as noted above, that the various polychlorophenols have an influence upon their solubilities mutually, and that they should occur in admixture with each other when used in practice. Probably also certain other chlorinated products formed during the production are of importance from the solubility standpoint.

During the production of the chlorophenols certain substances are formed, which cannot be dissolved but have to be separated in some way or other. The concentration of insoluble material seems to increase the more chlorine is added.

The concentrations of the chlorophenols which may be obtained in solution are not very high but are sufficient for impregnation purposes, and agents suitable for practical use may be composed within the limits allowed by the solubility conditions. These limits can be essentially widened in reality if the effect of the agent is based more upon the effect of the copper radical, which will be the case if more copper radical is introduced into the agent than that which corresponds to the composition of the metal phenolates. This is well justified in most cases. Copper pentachlorophenolate contains 10.7 percent of copper; the copper tetrachlorophenolate, a little more, and the copper trichlorophenolate still more, i.e., 13.9 percent of the copper. The copper radical is a very good protecting agent having other properties supplementing those of the chlorophenols. It is precipitated from the ammoniacal solutions in a very difficultly soluble condition, and is even better fixed in the wood than are the chlorophenols. The copper radical should thus be added in such a high content that its special action is taken advantage of. Laboratory tests indicate that pentachlorophenol has a 10 times higher protective effect than has the copper radical. Yet, even if such laboratory values are of no real practical interest, they indicate that the copper radical should not occur in too low a concentration if full advantage is to be realized from the same. In those cases in which the effect shall, to some essential extent, be based upon the amine-forming metal, it is justified to increase the copper radical content to, for instance, 10 to 20 times the quantity corresponding to the composition of the phenolates, i.e., the copper content is increased in these cases to the same as, or twice that of, the chlorophenol content. Under these circumstances, only a small part of the copper radical content of the agent becomes combined with chlorophenol after the impregnation, most of the copper radical precipitating in the wood as other salts which have a higher resistance to leaching than have the chlorophenols.

For full impregnation of Swedish pinewood, the composition of the agent can evidently be limited to amine-forming metal concentrations between 0.1 to 1.0 percent, preferably 0.1 to 0.6 percent, and to chlorophenol contents up to 2 percent. In those cases in which the protective effect of the agent is based upon the metal amine, the chlorophenol content may be reduced to below 0.6 percent or even below 0.3 percent.

In order to obtain suitable solutions, the use of sulphate, chloride and so on, radicals which may form electrolytes after the impregnation should be avoided, or at least only such a low content thereof should be used that they are precipitated in the form of basic salts after the impregnation. In order to obtain stable solutions, carbon dioxide may be contained in the composition, preferably in a quantity which is higher than that of the metal content. This applies especially if the copper content is high in relation to the chlorophenol content.

Instead of, or together with, copper other amine-forming metals may be used, for instance, zinc, nickel, cobalt, cadmium and silver. Instead of chlorophenols, other organic substances with protective effect and soluble in the system may be used, such as chlorinated or nitrated products.

Examples of aqueous impregnation solutions containing chlorophenol include (by weight):

(1) 0.3 percent of copper
    0.15 to 0.3 percent of tri- and tetraphenols in admixture, if desired, with pentachlorophenol, technical qualities
    0.45 percent of ammonia
    0.4 percent of carbon dioxide (2) 0.2 percent of copper
    1.5 percent of tri- and tetra-chlorophenols in admixture, if desired, with pentachlorophenol, technical qualities
    0.6 percent of ammonia
    0.4 percent of carbon dioxide The solutions stated are intended for full impregnation of Scandinavian pinewood. When using other methods of treatment the strength of the solution has to be changed so that the wood always receives a sufficient amount of preservative. For instance, when using the Lowry process, which is very suitable for the preservative, the wood will only absorb half the amount of the solution as would be the case by the full cell method. The strength of the solution has, therefore, in such a case to be increased double the amount suitable for the full cell method.

The agents are preferably distributed in the form of two concentrates—one containing metal-amine solution and the other chlorophenol. For preparing the ultimate solution, the two concentrates are first diluted, whereafter the diluted solutions are mixed. This is easily done in apparatus of simple construction. The chlorophenol may also be distributed in solid condition but in this case there are often difficulties from dusting. As an example there may be mentioned a copper concentrate containing, per liter, 150 g. of copper, 225 g. of ammonia, 200 g. of carbon dioxide and a chlorophenol solution containing 150 g. of purified technical chlorophenol in the form of its sodium salt. These concentrates are intended for the production of solutions according to Example 1 where the content of metal is rather high. The content of solvent for the copper radical is somewhat higher for solutions according to Example 2 where the chlorophenol content is higher. Thus, the composition of the copper concentrate is, for instance, 75 g. of copper, 225 g. of ammonia and 150 g. of carbon dioxide per liter.

Due to the carbon dioxide content and the presence of the metal amine the smell of the concentrated metal amine solutions is unexpectedly low. The ammoniacal smell is only as strong as that of a 5 to 10 times weaker aqueous solution of ammonia. The smell of the ready solutions is very weak.

The metal amine solution is produced by causing a concentrated solution of ammonia and carbon dioxide, while blowing through air or oxygen, to react with copper or other amine-forming metal which is thereby dissolved so that a concentrate is eventually obtained. The concentrates may also be produced by dissolving copper carbonate in an aqueous solution of ammonia and carbon dioxide.

For the production of concentrates with chlorophenol, the technical chlorophenol preparations generally must, as earlier indicated, be purified before they can be used. This can be done for instance by adding a small amount of copper amine solution to a concentrate of sodium phenolate solution, by which a precipitate is formed which is filtered off. The concentrate is thereafter suitable for distribution and use. Certain technical preparations of polychlorophenol have been found suitable for use after only a slight purification or after a filtration: these latter were technical tetrachlorophenols, or, technical pentachlorophenols which contained large amounts of tetrachlorophenols and also trichlorophenols.

This application contains subject matter in common with my application Serial No. 503,902, and is a continuation-in-part of the latter.

I claim:

1. A preservative composition consisting essentially of an aqueous ammoniacal solution of metal salts of at least two polychlorophenols of the group consisting of trichlorophenols, tetrachlorophenols and pentachlorophenol said metal being selected from the group consisting of copper, zinc, nickel, cadmium, cobalt and silver.

2. A preservative composition as defined in claim 1, in which the metal is copper, and in which the metal content is from about 2 to about 20 times greater than the stoichiometric equivalent of the polychlorophenols content of the composition.

3. An aqueous wood-preserving impregnation solution consisting essentially of 0.3% copper
0.15–0.3% mixture of at least two polychlorophenols selected from the group consisting of trichlorophenol, tetrachlorophenol and pentachlorophenol
0.45% ammonia
0.4% carbon dioxide 4. An aqueous wood-preserving impregnation solution consisting essentially of
0.2% copper
1.5% mixture of at least two polychlorophenols selected from the group consisting of trichlorophenol, tetrachlorophenol and pentachlorophenol
0.6% ammonia
0.4% carbon dioxide

References Cited in the file of this patent

UNITED STATES PATENTS

| | | |
|---|---|---|
| 959,505 | Gerlache | May 31, 1910 |
| 2,149,284 | Gordon | Mar. 7, 1939 |
| 2,322,633 | Hitchens | June 22, 1943 |
| 2,651,648 | Meyer | Sept. 8, 1953 |
| 2,772,199 | Zakheim | Nov. 27, 1956 |
| 2,772,200 | Zakheim | Nov. 27, 1956 |

FOREIGN PATENTS

| | | |
|---|---|---|
| 23,139 | Great Britain | June 20, 1913 |